United States Patent
Baumann

(10) Patent No.: US 10,202,109 B2
(45) Date of Patent: Feb. 12, 2019

(54) BRAKE SYSTEM FOR A VEHICLE AND METHOD FOR OPERATING A BRAKE SYSTEM FOR A VEHICLE

(75) Inventor: Dietmar Baumann, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 839 days.

(21) Appl. No.: 13/978,986

(22) PCT Filed: Nov. 23, 2011

(86) PCT No.: PCT/EP2011/070762
§ 371 (c)(1),
(2), (4) Date: Sep. 16, 2013

(87) PCT Pub. No.: WO2012/097902
PCT Pub. Date: Jul. 26, 2012

(65) Prior Publication Data
US 2014/0001821 A1    Jan. 2, 2014

(30) Foreign Application Priority Data

Jan. 21, 2011    (DE) .................. 10 2011 002 966

(51) Int. Cl.
*B60T 13/14*    (2006.01)
*B60T 8/40*    (2006.01)

(52) U.S. Cl.
CPC .......... *B60T 13/142* (2013.01); *B60T 8/4081* (2013.01)

(58) Field of Classification Search
CPC ..... B60T 7/04; B60T 7/12; B60T 8/17; B60T 8/171; B60T 8/172; B60T 8/4018;
(Continued)

(56) References Cited

U.S. PATENT DOCUMENTS 3,588,191 A * 6/1971 Atkin ................... B60T 8/26
188/181 A
4,116,495 A * 9/1978 Belart ................. B60T 8/4225
303/115.4
(Continued)

FOREIGN PATENT DOCUMENTS

DE       102 38 278 A1    4/2003
DE    10 2004 025 638 A1    9/2005
(Continued)

OTHER PUBLICATIONS

English Machine Translation of JP-200334244 (Year: 2003).*
(Continued)

*Primary Examiner* — Melody M Burch
(74) *Attorney, Agent, or Firm* — Maginot, Moore & Beck LLP

(57) ABSTRACT

A brake system includes a brake activation element, an activation-element-coupling device having a first piston which is moved into a first internal chamber of the activation-element-coupling device by activating the brake activation element, a master brake cylinder with a second piston to which a driver braking force is transmitted in a driver braking mode to move the second piston into a second internal chamber of the master brake cylinder, a braking medium reservoir, which is hydraulically disconnected from the second internal chamber when the second piston moves a minimum travel distance, and at least a first wheel brake cylinder and at least a first pump. In an external force braking mode, movement of the second piston is prohibited despite the driver's braking force, and the at least one first pump pumps a braking medium volume out of the braking medium reservoir into the at least one first wheel brake cylinder.

13 Claims, 3 Drawing Sheets

(58) Field of Classification Search
CPC ........ B60T 13/10; B60T 13/14; B60T 13/142;
B60T 13/147; B60T 13/20; B60T 13/66;
B60T 13/68; B60T 2201/03; B60T
2220/04; B60T 8/4081
USPC .............................. 303/10, 11, 15, 20, 113.4
See application file for complete search history.

(56) References Cited

U.S. PATENT DOCUMENTS

| | | | | |
|---|---|---|---|---|
| 5,169,216 | A * | 12/1992 | Schmidt | ................... B60T 8/348 |
| | | | | 188/DIG. 1 |
| 2003/0020327 | A1* | 1/2003 | Isono | ................... B60T 8/4081 |
| | | | | 303/113.4 |
| 2006/0168956 | A1* | 8/2006 | Sakai | ......................... F15B 1/26 |
| | | | | 60/473 |
| 2008/0179941 | A1* | 7/2008 | Matsushita | ........... B60T 8/3275 |
| | | | | 303/20 |
| 2011/0125332 | A1* | 5/2011 | Heitman | ............... F04B 49/065 |
| | | | | 700/282 |
| 2011/0224881 | A1* | 9/2011 | Matsushita | ............. B60T 7/042 |
| | | | | 701/70 |

FOREIGN PATENT DOCUMENTS

| | | |
|---|---|---|
| DE | 10 2006 014 836 A1 | 10/2007 |
| JP | 2002-211386 A | 7/2002 |
| JP | 2003-34244 A | 2/2003 |
| JP | 2003-137084 A | 5/2003 |
| JP | 2004-528214 A | 9/2004 |
| JP | 2006-76564 A | 3/2006 |
| JP | 2006-151342 A | 6/2006 |
| JP | 2007-284007 A | 11/2007 |
| WO | 02/26538 A1 | 4/2002 |
| WO | 2009/121645 A1 | 10/2009 |
| WO | 2010/057730 A1 | 5/2010 |
| WO | 2010/091883 A1 | 8/2010 |

OTHER PUBLICATIONS

International Search Report corresponding to PCT Application No. PCT/EP2011/070762, dated Feb. 1, 2012 (German and English language document) (7 pages).

\* cited by examiner

BRAKE SYSTEM FOR A VEHICLE AND METHOD FOR OPERATING A BRAKE SYSTEM FOR A VEHICLE

This application is a 35 U.S.C. § 371 National Stage Application of PCT/EP2011/070762, filed on Nov. 23, 2011, which claims the benefit of priority to Serial No. DE 10 2011 002 966.4, filed on Jan. 21, 2011 in Germany, the disclosures of which are incorporated herein by reference in their entirety.

The disclosure concerns a brake system for a vehicle. The disclosure furthermore concerns a method for operating a brake system for a vehicle.

BACKGROUND

DE 10 2004 025 638 A1 describes a brake system for motor vehicles. On activation of the brake pedal, a first piston of the brake system can be moved into an inner chamber, encased by a second piston, with an elastic element. Parallel movement of the second piston with the first piston causes a pressure on a third piston of a master cylinder. As an alternative to the direct braking by the vehicle driver in the master brake cylinder, by means of the pressure transmitted via the second piston to the third piston via a hydraulic pressure provision module with a pressure medium storage reservoir and a first pump to fill the pressure medium storage reservoir, a pressure can be created in an intermediate chamber between the second piston and the third piston. By means of the created pressure, the third piston can be moved at least partly into the master brake cylinder and the second piston out of the master brake cylinder. Arranged on the master brake cylinder are two brake circuits, each with a second and a third pump. The brake system therefore has a first pump motor to operate the first pump and a second pump motor to operate the second pump and the third pump.

SUMMARY

The disclosure concerns a brake system for a vehicle with the features described herein and a method for operating a brake system with the features described herein.

Since in the external force braking mode which can be used as the "normal" mode, no force is required to be exerted by the driver on the brake activation element, for example on a brake pedal, to build up the brake pressure in the at least one wheel brake cylinder, there is no need to equip the brake system with a brake servo. Thus for example a brake servo and a vacuum pump can be omitted in the brake system. This reduces the space required and the cost of the brake system.

The disclosed brake system guarantees a build-up of brake pressure in at least one wheel brake cylinder by means of the at least one first pump of the at least one first brake circuit, which pump can also be used as a return delivery pump. This further reduces the space required and the cost of the brake system.

Since in driver braking mode in which the brake system can usually be operated, for all system functions the driver is decoupled in energy terms from the activation of the at least one first pump, economic pump types such as reciprocating piston pumps can be used for the at least one first pump. Also on use of the at least one first pump as a return delivery pump or a brake pressure reducing pump, the driver is decoupled from the master brake cylinder. Thus the pump activation in the drive train with the brake activation element is not perceived by the driver. Thus an advantageous comfort is guaranteed for the driver on activation of the brake activation element, even when there is no uniformity of pump delivery flow.

In contrast to an ESP hydro-assembly with vacuum brake servo, the brake system described here requires only one pump motor. Also no further electric motor is required in addition to the single pump motor for brake force amplification.

By integrating the hydraulic assembly and activation unit, the at least one first pump which can be operated as a return delivery pump can be arranged at a comparatively small distance from the master brake cylinder and the braking medium reservoir (storage container). Thus the suction line between the at least one first pump and the master brake cylinder can be formed with a comparatively short suction line length. This allows a high pressure build-up dynamic, in particular at low temperatures, without additional components.

As is described more precisely below, the brake system can be executed with a single pipe route (pipe system) with in total only eight connecting points (threaded connections). This guarantees an economic assembly, simple to perform, of the brake system in a vehicle.

Preferably the brake system can be controlled by means of a first valve at least out of the driver braking mode into the external force braking mode and out of the driver braking mode into the driver braking mode. Thus to suppress movement of the second piston by the minimum movement travel despite the driver brake force transmitted to the first piston, an economical valve can be used.

In an advantageous refinement, the brake system comprises a simulator spring to which, in a first simulation mode of the brake system, the driver brake force transmitted to the first piston can be transmitted such that the simulator spring can be deformed by means of the driver brake force, wherein the brake system can be controlled out of the first simulation mode into a second simulation mode in which the first piston, on/despite the presence of the simulator spring in its extended position, can be moved at least partly into the first inner chamber of the activation element coupling device. Via the simulator spring thus in the first simulation mode, an additional simulator force countering the movement of the first piston can be exerted on the brake activation element, which force is omitted in the second simulation mode. Thus by controlling the brake system into the first simulation mode, during the external force braking mode despite the suppressed feedback effect of the pressure present in the master brake cylinder and the at least one first brake circuit on the brake activation element, a (standard) pedal feel advantageous for the driver can be achieved. Also by controlling the brake system into the second simulation mode, it can be ensured that the driver in the driver braking mode causes a build-up of brake pressure in the at least one first wheel brake cylinder already when a relatively low force is exerted on the brake activation element.

Preferably the brake system can be controlled by means of a second valve at least out of the first simulation mode into the second simulation mode and out of the second simulation mode into the first simulation mode. This guarantees an economical formation of the brake system. At the same time the common use of the first valve and second valve guarantees simple operability of the brake system.

Preferably the first valve is a normally open valve and the second valve a normally closed valve. In this case on function deterioration of the vehicle on-board network, the brake system is controlled automatically into driver braking mode and into the second simulation mode of the brake system.

In an advantageous embodiment, the brake system comprises a control device which is adapted to control the brake system at least out of the driver braking mode into the external force braking mode and out of the external force braking mode into the driver braking mode, to receive an actuating variable provided by a sensor in relation to activation of the brake activation element, to establish a nominal braking medium volume to be displaced into the at least one wheel brake cylinder taking into account at least the actuating variable received, and to control the at least one first pump of the brake system controlled into the external force braking mode such that by means of the at least one first pump, a braking medium volume corresponding to the nominal braking medium volume is pumped out of the braking medium reservoir via the master brake cylinder into the at least one first wheel brake cylinder. This guarantees a braking of the vehicle corresponding to a nominal vehicle deceleration predefined by the driver. In the external force braking mode, the nominal braking medium volume to be pumped into the at least one first wheel brake cylinder can be established at least taking into account an actuating variable relating to activation of the brake activation element by the driver, for example a brake pressure and/or a brake travel. In addition the control device can be adapted to establish the nominal braking medium volume additionally taking into account a recuperative brake moment exerted by a recuperative brake, in particular a generator, on at least one wheel of the vehicle. By means of the control device the recuperative brake moment can thus easily be integrated, wherein the nominal vehicle deceleration specified by the driver can be maintained.

The usability of the brake system described here is not however limited to electric or hybrid vehicles. For example the braking medium volume to be displaced into the at least one first wheel brake cylinder can be established also taking into account a braking variable predefined by a driver assistance system (e.g. ACC, emergency brake system or parking assistance system) in relation to a nominal total braking moment of the vehicle. Thus the brake system described here is also particularly suitable for cooperation with a driver assistance system such as for example an ACC system, an emergency brake system or a parking assistance system.

In an advantageous refinement the brake system can also be controlled into a dynamic braking mode in which the driver brake force transmitted to the first piston can be transmitted at least partly to the second piston such that the second piston can be moved out of its starting position at least partly into the second inner chamber of the master brake cylinder, and by means of the at least one first pump or at least one further pump, an additional braking medium volume can be pumped out of the at least one storage chamber of the at least one brake circuit into the at least one wheel brake cylinder. In this way the vehicle can be braked more quickly, in particular brought to a stop more quickly. Control of the brake system into the dynamic braking mode can take place taking into account a brake travel, a brake travel change, a brake force, a brake force change, an ambient situation and/or a vehicle component situation. Thus in particular on strong activation of the brake activation element, on sudden activation of the brake activation element, on function deterioration of a vehicle component and/or in a traffic situation requiring rapid braking of the vehicle, the vehicle can reliably be braked within a comparatively short time.

Advantageously a suction line length from a suction side of the first pump to the master brake cylinder is less than 25 cm, preferably less than 20 cm, in particular less than 15 cm. The suction line length can preferably be less than 10 cm. In this way a high pressure build-up dynamic can be achieved.

In an advantageous embodiment the first inner chamber of the activation element coupling device can be connected via the first valve with a first pressure chamber of the master brake cylinder, wherein the second piston of the master brake system delimits the second inner chamber and the first pressure chamber. Thus by means of the hydraulic connection achieved via the open first valve, the driver brake force can be reliably transmitted to the second piston.

In a further advantageous embodiment the activation element coupling device comprises a movable inner piston which delimits the first inner chamber and a second pressure chamber and which is supported via the simulator spring of the first piston, wherein the second piston of the master brake cylinder delimits the first inner chamber and the first pressure chamber and is arranged on the inner piston such that the driver brake force transmitted to the first piston can be transmitted at least partly via the inner piston to the second piston, and wherein the second pressure chamber is connected with the first pressure chamber via the first valve. Closing of the first valve thus suppresses a volume enlargement of the pre-chamber delimited by the second piston and thus reliably suppresses the movement of a second piston by the minimum travel.

Alternatively or additionally the first inner chamber with the simulator spring arranged therein can be connected with the braking medium reservoir via the second valve. In this case, insofar as the second valve is controlled in the closed state, a volume reduction of the first inner chamber and hence a deformation of the simulator spring arranged therein can be reliably prevented.

Alternatively the first inner chamber can be connected via the second valve with a pre-chamber of a further piston-cylinder unit with a simulator chamber and the simulator spring arranged in the simulator chamber. Control of the second valve in the open state in this case causes a volume increase in the pre-chamber, by means of which a separating element delimiting the pre-chamber and simulator chamber with the simulator spring can be displaced such that the simulator spring is deformed or compressed.

Advantageously the brake system comprises at least one second brake circuit arranged on the master brake cylinder with at least one second wheel brake cylinder and at least one second pump, wherein the brake system has precisely one pump motor, on the shaft of which are arranged the at least two pumps of the brake system. In contrast to the prior art, the brake system described here thus, despite the load relief of the driver in terms of force and work on braking of the brake system controlled into external force braking mode, requires only one motor and no further brake servo motor. This reduces the construction space required and the costs of the brake system.

The advantages described in the paragraphs above are also guaranteed with a corresponding method for operating a brake system for a vehicle.

BRIEF DESCRIPTION OF THE DRAWINGS

Further features and advantages of the present disclosure are explained below with reference to the figures.

These show.

DETAILED DESCRIPTION

Figure 1:
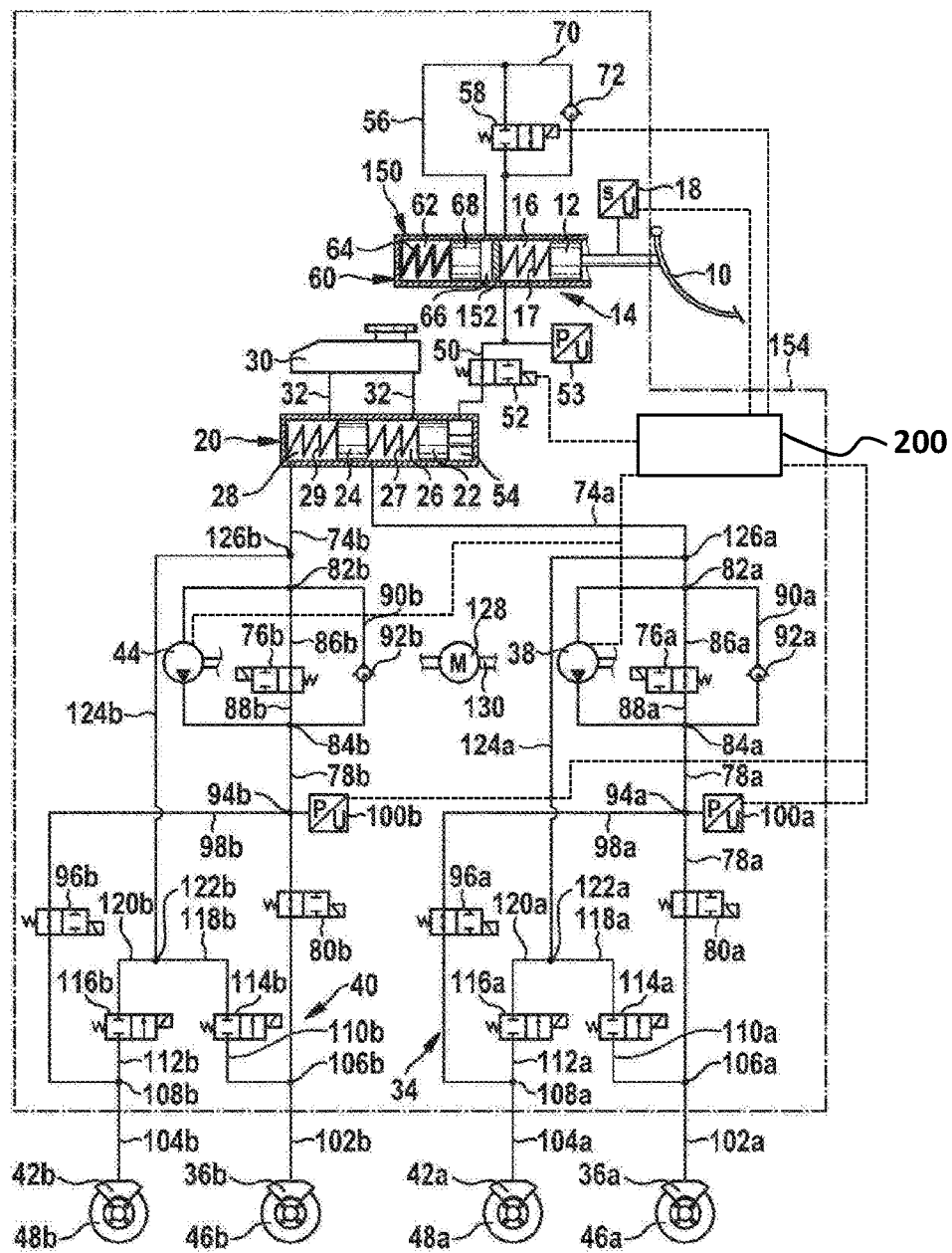
FIG. 1 a diagrammatic depiction of a first embodiment of the brake system.

FIG. 1 shows a diagrammatic depiction of a first embodiment of the brake system.

The brake system in FIG. 1 which can be used in a vehicle has a brake activation element 10 which for example is formed as a brake pedal. Instead of or in addition to a brake activation element 10 formed as a brake pedal, the brake system can however have another embodiment of an activation element which can be activated by a driver for braking the vehicle.

A first piston 12 of an activation element coupling device 14 is arranged on the brake activation element such that the first piston 12, by means of activation of the brake activation element 10, can be moved at least partly into a first inner chamber 16 of the activation element coupling device 14. By means of a return spring 17 arranged in the first inner chamber, it can be guaranteed that the first piston 12 lies in its starting position on non-activation of the brake activation element 10.

Optionally a sensor 18 is arranged on the brake activation element 10 and/or on the first piston 12 such that by means of the sensor 18, an activation travel of the brake activation element 10 and/or the first piston 12, and/or a force transmitted to the brake activation element 10 and/or the first piston 12 can be determined. In a preferred embodiment the sensor 18 is formed as a brake force sensor and/or brake travel sensor. The brake system is however not restricted to the application of such a sensor 18. For example by means of a sensor 18 formed as a pressure sensor, a pressure in the first inner chamber 16 can be determined as a substitute variable for the pedal force.

The brake system also has a master brake cylinder 20 with a second piston 22, e.g. a floating piston. The master brake cylinder 20 can in particular be formed as a tandem master brake cylinder. In this case a further piston 24 is connected with the second piston 22 such that the further piston 24 can be moved in parallel with the second piston 22. Instead of a tandem master brake cylinder, the brake system can also have another type of master brake cylinder 20.

The brake system can be operated in a driver braking mode in which a driver brake force transmitted to the first piston 12 can be transmitted at least partly to the second piston 22 such that the second piston 22 can be moved out of its starting position at least partly into a second inner chamber 26 of the master brake cylinder 20. Insofar as the master brake cylinder 20 is a tandem master brake cylinder, the further piston 24 which can be moved in parallel with the second piston 22 can be moved out of its starting position at least partly into a further inner chamber 28 of the master brake cylinder 20. The term starting position can be understood to mean a position of the second piston 22 and/or the further piston 24 in which these are present on non-activation of the brake activation element 10 by the driver. This can be guaranteed in a simple manner by means of the return springs 27 and 29.

On the presence of the second piston 22 (and the further piston 24) in the starting position, a braking medium reservoir 30, which can also be designated a storage reservoir, is hydraulically connected with the second inner chamber 26 (and the further inner chamber 28). This can be understood to mean that on the presence of the second piston 22 (and the further piston 24) in the starting position, a braking medium exchange is guaranteed between the braking medium reservoir 30 and the second inner chamber 26 (and the further inner chamber 28) via the hydraulic connection. The hydraulic connection between the braking medium reservoir 30 and the second inner chamber 26, where applicable between the braking medium reservoir 30 and the further inner chamber 28, is suppressed on movement of the second piston 22, or the further piston 24, by a minimum movement travel. This suppression can be understood as a sealing and/or a closure. This can for example be achieved simply by implementation of the hydraulic connection between the master brake cylinder and braking medium reservoir 30 via at least one orifice hole 32.

The brake system has at least one first brake circuit 34 arranged on the master brake cylinder 20 with at least one first wheel brake cylinder 36a and 42a and at least one first pump 38. Optionally the brake system also has at least one second brake circuit 40 arranged on the master brake cylinder 20 with at least one second wheel brake cylinder 36b and 42b and at least one second pump 44. The brake system is not however restricted to equipment with two brake circuits 34 and 40.

By means of one respective wheel brake cylinder 36a, 36b, 42a and 42b, in each case one wheel 46a, 46b, 48a and 48b of the motor vehicle can be braked. For example the wheels 46a and 48a allocated to the first brake circuit 34 can be arranged on the vehicle as the left front wheel and right rear wheel, while the wheels 46b and 48b allocated to the second brake circuit 40 serve as the right front wheel and left rear wheel. The brake system described here is not however restricted to a cross brake circuit division. Instead the wheels allocated to a brake circuit 34 or 40 can also here be arranged on a common axle (as front wheels or rear wheels). Also the wheels allocated to one brake circuit 34 or 40 can be arranged on one side of the vehicle. The brake system described here is not limited to application in a vehicle with precisely four wheels 46a, 46b, 48a and 48b.

In driver braking mode, by means of a pressure build-up in the master brake cylinder 20 resulting from activation of the brake activation element 10, the driver can brake directly into at least one wheel brake cylinder 36a, 36b, 42a and 42b. In addition the brake system can be controlled out of the driver braking mode into at least one external force braking mode. In the external force braking mode, movement of the second piston 22 (and the further piston 24) by the minimum movement travel is suppressed despite the driver brake force transmitted to the first piston 12. This could also be described such that even on activation of the brake activation element 10, via which the first piston 12 is moved out of its starting position, a parallel movement of the second piston 22 (and the further piston 24) from its starting position by a movement travel of at least the minimum movement travel is suppressed. Thus on control of the brake system into external force braking mode, it is guaranteed that the hydraulic connection between the braking medium reservoir 30 and the master cylinder 20 is at least partly open, preferably fully open, despite activation of the brake activation element 10 and parallel movement of the first piston 12. Furthermore the at least one brake circuit 34 and 40 of the brake system is designed such that by means of its at least one pump 38 and 44, a braking medium volume can be pumped to the braking medium reservoir 30 via the master brake cylinder 20 into the at least one wheel brake cylinder 36a, 36b, 42a and 42b. The brake system with two similarly constructed brake circuits 34 and 40 can thus have a comparatively simple construction. The construction of the brake system is not however limited to a similar formation of the two brake circuits 34 and 40.

After control of the brake system into the external force braking mode, the brake pressure present in the at least one wheel brake cylinder 36a, 36b, 42a and 42b can therefore be built up/set without consuming a force exerted by the driver on the brake activation element 10. In the external force braking mode, a relation between the brake travel/brake force exerted on the brake activation element 10 and the brake pressure built up in the at least one wheel brake cylinder 36a, 36b, 42a and 42b can therefore be freely predefined via control of the at least one first pump 38 and 44. Thus in external force braking mode, a relation can be created between the brake travel/brake force exerted on the brake activation element 10 and the brake pressure built up, at which even a relatively small brake force/brake travel causes a relatively high brake pressure. Braking of the vehicle by means of the brake system controlled in external force braking mode is therefore comfortable for the driver and can be performed without major force application. In particular the brake system can be operated such that the external force braking mode is present as "normal mode". In this case the brake system does not require a brake servo with which conventionally a supporting force is exerted on the master brake cylinder piston in addition to the driver brake force, in order to relieve the force load on the driver on braking of the vehicle. Thus there is no need also for a brake servo motor, a motorized pump to fill the pressure medium storage reservoir and/or a hydraulic pressure supply module. Instead the load relief on the driver in terms of work and force can be achieved by means of a pump 38, which can also be used as a return pump, and a pump 44. It is also pointed out here that the relation advantageous to the driver between the brake travel/brake force exerted on the brake activation element 10 and the brake pressure built up in the at least one wheel brake cylinder 36a, 36b, 42a and 42b, requires only corresponding programming of economical electronics.

A first embodiment example for achieving the advantageous suppression of parallel movement of the second piston 22 (and the further piston 24) with the first piston 12 is described below:

In the brake system in FIG. 1, the first inner chamber 16 is connected via a line 50 with a first valve 52 inserted therein to a first pressure chamber 54 of the master brake cylinder 20. Here the second piston 22 delimits the first pressure chamber 54 and the second inner chamber 26 such that a movement of the second piston 22 to enlarge the volume of the first pressure chamber reduces the size of the second inner chamber 26, while a movement of the second piston 22 in the opposite direction to enlarge the volume of the second inner chamber 26 reduces the size of the first pressure chamber 54. Thus by means of closing the first valve 52, a volume displacement from the first inner chamber 16 into the first piston chamber 54 can be suppressed despite the inward movement of the first piston 12, whereby a volume increase of the first pressure chamber 54 and hence also an at least partial inward movement of the second piston (by the minimum movement travel) into the second inner chamber 26 is prevented. The brake system can thus be controlled from driver braking mode into external force braking mode by means of closing the first valve 52. After an at least partial opening of the first valve 52, a volume displacement out of the first inner chamber 16 into the first pressure chamber 54 and hence a movement of the second piston 22 by at least the minimum braking travel is again guaranteed, whereby the brake system can be controlled out of the external force braking mode into the driver braking mode by means of an at least partial opening of the first valve 52. In addition the brake system can have a pressure sensor 53 which is arranged between the first inner chamber 16 and the first valve and by means of which the pressure in the first inner chamber 16 can be determined indirectly.

Optionally the brake system also comprises an activation element coupling device (with a simulator spring 64) to which, in a first simulation mode, the driver brake force transmitted to the first piston can be transmitted such that the simulator spring 64 can be deformed by means of the driver brake force, wherein the brake system can be controlled out of the first simulation mode into a second simulation mode in which the first piston 12, on the presence of the simulator spring 64 in its extended position, can be moved at least partly into the first inner chamber 16.

In the brake system in FIG. 1 this is guaranteed in that the first chamber 16 is connected, via a line 56 with second valve 58 arranged therein, also to a further piston-cylinder unit 60. The further piston-cylinder unit 60 comprises a simulator chamber 62 with the simulator spring 64, a pre-chamber 66 and an intermediate piston 68 movably arranged between the simulator chamber 62 and the pre-chamber 66. The intermediate piston 68 delimits the simulator chamber 64 and pre-chamber 66 such that a volume increase in the pre-chamber 66 causes a corresponding volume reduction in the simulator chamber 62, and a volume reduction in the pre-chamber 66 causes a corresponding volume increase in the simulator chamber 62 because of a corresponding movement of the intermediate piston 68. The volume reduction of the simulator chamber 62 or corresponding adjustment movement of intermediate piston 68 is countered by the simulator spring 64.

Optionally a bypass line 70 with a non-return valve 72 runs parallel to the second valve 58. By the arrangement of the non-return valve 72, a volume displacement out of the first inner chamber 16 into the pre-chamber 66 via the bypass line 70 can be suppressed.

The line 56 opens in the pre-chamber 66. Insofar as the second valve 58 is at least partly opened, a braking medium displacement is possible out of the first inner chamber 16 into the pre-chamber 66 via the line 56, whereby a volume increase of the pre-chamber 66 occurs with corresponding volume reduction of simulator chamber 62. Via the simulator spring 64 thus a further counterforce (simulator force) can be exerted in addition to the return force of the return spring 17 on the first piston 12, which has moved out of its starting position, insofar as the second valve 58 is at least partly opened. This could also be described as controlling into the first simulation mode by at least partial opening of the second valve. Via closing of the second valve 58, the brake system can be controlled accordingly out of the first simulation mode into the second simulation mode in which a braking medium displacement out of the first inner chamber 16 into the pre-chamber 66 is suppressed, and hence the first piston 12 can be moved into the first inner chamber 16 without the simulator spring 64 being deformed. Thus the adjustment movement of the first piston 12 out of its starting position is not countered by any simulator force caused by deformation of the simulator spring 64.

In this way by means of opening of the second valve 58, after closing of the first valve 52, it is ensured that despite the decoupling of the master brake cylinder 20, because of the simulator force exerted additionally on the brake activation element 10, the driver still has an advantageous (standard) pedal feel. In addition by means of closing of the second valve 58, it can be guaranteed that in particular in driver braking mode, the adjustment movement of the first piston 12 into the first inner chamber 16 is not countered by any simulator force and hence the force applied by the driver on the brake activation element 10 can be used (almost) exclusively for braking in the master brake cylinder 20/for pressure build-up in the at least one wheel brake cylinder 36a, 36b, 42a and 42b. Therefore despite the advantageous (standard) brake feel during external force braking mode, after controlling of the brake system into driver braking mode, the driver still has the possibility of braking rapidly and with comparatively low force on the master brake cylinder 20 such that an adequate brake pressure is built up in at least one wheel brake cylinder 36a, 36b, 42a and 42b.

Preferably the first valve 52 is a normally open valve. Thus on a deterioration of function of the vehicle onboard network, the brake system is automatically controlled into driver braking mode. Also a design of the second valve 58 as a normally closed valve is advantageous as in this case, on a deterioration in function of the onboard network, the simulator force countering the movement of the first piston 12 into the first inner chamber 16 is suppressed.

An advantageous embodiment of the two identically constructed brake circuits 34 and 40 is described below, to which however the brake system is not limited.

In the embodiment shown, each of the brake circuits 34 and 40 is connected with a master brake cylinder 20 via a suction line 74a or 74b. The suction lines 74a or 74b can lead to a suction side of a respective pump 38 or 44. A suction line length from the suction side of the respective pump 38 and 44 to the master brake cylinder can be less than 25 cm, preferably less than 20 cm, in particular less than 15 cm. Preferably the suction line length from the suction side of the respective pump 38 and 44 to the master brake cylinder 20 is less than 10 cm. This causes an advantageous pressure build-up dynamic. Due to the small distance of the pumps 38 and 44 from the master brake cylinder, suction losses in particular at low temperatures can also be reduced.

The pumps 38 and 44 are each connected via a line 78a and 78b with a wheel inlet valve 80a and 80b. Via a branch point 82a or 82b in suction line 74a or 74b, and a branch point 84a or 84b in the line 78a or 78b, a respective line 86a or 86b, a switch-over valve 76a or 76b arranged thereon and a further line 88a or 88b leading away from the switch-over valve 76a or 76b are guided in parallel to the pump 38 or pump 44 respectively. Also a bypass line 90a or 90b with non-return valve 92a or 92b runs between the branch points 82a and 84a, or 82b and 84b, wherein because of the orientation of the non-return valves 92a and 92b, a braking medium displacement from the respective line 78a or 78b via bypass line 90a or 90b to suction line 74a or 74b is suppressed.

In each case line 98a or 98b leading to a further wheel inlet valve 96a or 96b and a pressure sensor 100a and 100b are connected via a branch point 94a or 94b formed in line 78a or 78b. Each of the wheel inlet valves 80a, 80b, 96a and 96b is connected via a line 102a, 102b, 104a and 104b with an allocated wheel brake cylinder 36a, 36b, 42a and 42b. In each of lines 102a, 102b, 104a and 104b is formed a branch point 106a, 106b, 108a and 108b, from which a line 110a, 110b, 112a and 112b leads to a wheel outlet valve 114a, 114b, 116a and 116b. From two wheel outlet valves 114a, 114b, 116a and 116b of a brake circuit 34 and 40, a line 118a, 118b, 120a and 120b runs to a branch point 122a or 122b internal to the brake circuit. From each of branch points 122a and 122b, a line 124a or 124b leads to branch point 126a or 126b formed in the associated suction line 74a or 74b.

The brake circuits 34 and 40 have a comparatively low number of pipe connections. Also the brake circuits 34 and 40 are formed such that the pumps 38 and 44 can be used both to build up brake pressure in the wheel brake cylinders 36a, 36b, 42a and 42b and as return pumps. Due to the multi-functionality of the pumps 38 and 44, the construction space required and the costs of the brake system can be reduced.

The brake system has precisely one pump motor 128, on the shaft 130 of which are arranged pumps 38 and 44. In comparison with a conventional brake system, the brake system described here has the advantage that only one pump motor 128 is required to operate the return pumps and actively build up a brake moment in the wheel brake cylinders 36a, 36b, 42a and 42b. Also the necessary power of the pump motor 128 can be reduced because of the advantageous arrangement of pumps 38 and 44 at a small distance from the master brake cylinder 20, without having the drawback of slower braking of the vehicle.

To further reduce the construction space required by the brake system and/or to simplify installation of the brake system, the activation element coupling device 14 and the piston-cylinder unit 60 can be arranged in a common housing 150/in a common bore. This can also be described as a parallel arrangement of brake element coupling and master brake cylinder 20. For example the return spring 17 can be supported between the first piston 12 and a solid wall 152 which separates the first inner chamber fluid-tightly from the pre-chamber 66.

In a preferred embodiment, apart from the wheel brake cylinders 36a, 36b, 42a and 42b, all hydraulic elements together with the brake activation element 10 can be combined in an (integrated) hydraulic unit 154. Advantageously the (integrated) hydraulic unit 154 is mounted on a partition wall (bulkhead) between the passenger compartment and the engine bay (not shown in FIG. 1).

It is pointed out that the brake system in FIG. 1 requires no storage chambers other than the braking medium reservoir 30, since in all control functions in external force braking mode (service braking with brake force amplification, ABS, ASR, ESP), the system works without a pressure in the master brake cylinder 20, and the pressure in the wheel brake cylinders 36a, 36b, 42a and 42b can thus be reduced to ambient pressure. On reduction of the brake pressure built up in the wheel brake cylinders 36a, 36b, 42a and 42b, the braking medium volume thus automatically flows back into the braking medium reservoir 30 via the master brake cylinder 20. The brake system which works without a complex pressure accumulator has a hydraulic back-up.

Optionally the brake system has a control device 200 which in addition to controlling valves 52 and 58 is also adapted to receive an actuating variable in relation to activation of the brake activation element which is determined for example by a sensor 18, and taking into account at least the actuating variable, to establish a nominal braking medium volume to be displaced into the at least one wheel brake cylinder 36a, 36b, 42a and 42b. Also the control device 200 can be designed to control at least one pump 38 and/or 44 of the brake system controlled in external force braking mode such that by means of the at least one pump 38 or 44, a braking medium volume corresponding to the nominal braking medium volume is pumped from the braking medium reservoir 30 via the master brake cylinder 20 into the at least one wheel brake cylinder 36*a*, 36*b*, 42*a* and 42*b*. In addition to this, in establishing the nominal braking medium volume, account can be taken of a recuperative brake moment from a recuperative brake (not shown) and/or a nominal brake moment from a driver assistance system. Also on controlling the at least one pump 38 or 44, at least one sensor signal of the at least one pressure sensor 100*a* and 100*b* can be taken into account. Also pressure sensors evaluated by the control device 200 can be arranged at the wheel brake cylinders 36*a*, 36*b*, 42*a* and 42*b* in order to be able to implement sophisticated control and safety algorithms. The brake pressure in this case can always be regulated per individual wheel even during service brake function. In this way skewing of the vehicle can be avoided and optimum brake force distribution guaranteed. Any self-steering behavior can also be influenced thereby.

Figure 2:
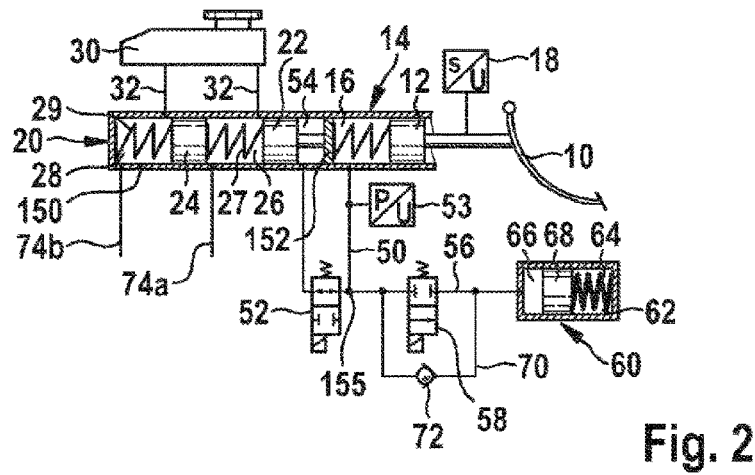
FIG. 2 a diagrammatic partial depiction of a second embodiment of the brake system.

FIG. 2 shows a diagrammatic partial depiction of a second embodiment of the brake system.

In the brake system indicated diagrammatically (in part) in FIG. 2, the brake activation element coupling device 14 and the master brake cylinder 20 are arranged in a common housing 150 separated by a solid wall 152. This could be called an arrangement of the pedal coupling and master brake cylinder 20 in a common bore. The piston-cylinder unit 60 is arranged separately from the housing 150/outside the common bore. By connecting the line 56 with the second valve 58 to the line 50, for example via a branch point 155 arranged between the first valve 52 and the first inner chamber 16, activation and deactivation of the simulator force which can be exerted on the brake activation element can be reliably guaranteed.

The brake system in FIG. 2 can also comprise the brake circuits 34 and 40 described above which will not be described again here.

Figure 3:
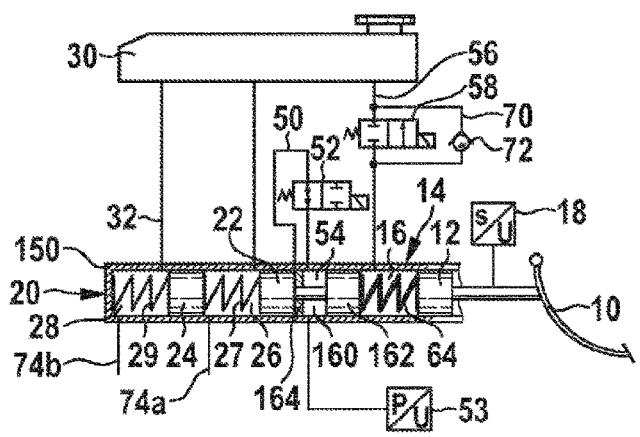
FIG. 3 a diagrammatic partial depiction of a third embodiment of the brake system.

FIG. 3 shows a diagrammatic partial depiction of a third embodiment of the brake system.

In the brake system shown partially diagrammatically in FIG. 3, a simulator spring 64 (instead of the return spring) is arranged in the first inner chamber 16. The first inner chamber 16 is connected to the braking medium reservoir 30 via the line 56 with second valve 58 arranged therein. Insofar as the second valve 58 is controlled into an at least partly open state therefore the first piston 12 can be moved against the simulator force even when the first valve 52 is closed.

In this embodiment the activation element coupling device 14 is formed as a simulator. This embodiment therefore requires comparatively little construction space. In addition the brake activation element coupling device 14 and the master brake cylinder 20 are arranged in a common housing 150/in a common bore with a solid wall 152 between the activation element coupling device 14 and the master brake cylinder 20, whereby the construction space required can be reduced further and the installation of the brake system simplified. Also only three movable pistons 12, 22 and 24 are required.

Figure 4:
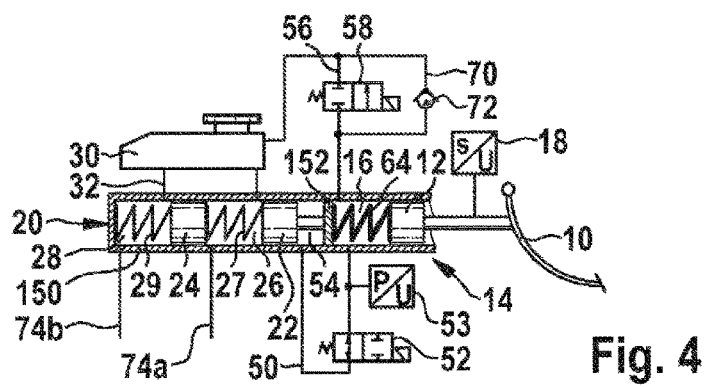
FIG. 4 a diagrammatic partial depiction of a fourth embodiment of the brake system.

FIG. 4 shows a diagrammatic partial depiction of a fourth embodiment of the brake system.

In the brake system shown partially diagrammatically in FIG. 4, the simulator spring 64 is again arranged in the first inner chamber 16 of the activation element coupling device 14. Also the activation element coupling device 14 formed as a simulator and the master brake cylinder are formed in a common housing 150/a common bore.

In addition the activation element coupling device 14 comprises a movable inner piston 162 which delimits the first inner chamber 16 and a second pressure chamber 160 and which is supported via the simulator spring 64 of the first piston 12 arranged in the first chamber 16. A volume reduction of the first inner chamber 16 due to of a movement of the inner piston 162 causes a reduction in size of the second pressure chamber 160, while a volume reduction of the first inner chamber 16 due to the movement of the inner piston 162 leads to an enlargement of the second pressure chamber 160. A solid wall 164 between the second pressure chamber 160 and the first pressure chamber 54 of the master brake cylinder 20 has an opening through which a part of the second piston 22 of the master brake cylinder 20 protrudes. A seepage of fluid can be prevented for example via a sealant between the solid wall 164 and the protruding part of the second piston 22.

The second piston 22 (and the further piston 24) are supported on the inner piston 162 such that the driver brake force transmitted to the first piston 12 can be transmitted via the inner piston 162 at least partly to the second piston 22 (and the further piston 24). The solid wall 164 between the second pressure chamber 160 and the first pressure chamber 54 is bridged via the line 50 with the first valve 52 inserted therein. As soon as the first valve 52 is controlled into the at least partly opened state, a volume reduction of the second pressure chamber 160 is possible with simultaneous volume increase in the first pressure chamber 54. Thus the pistons 12 and 162 can be moved together without a reduction in size of the first inner chamber 16 and hence a deformation/compression of the simulator spring 64. The adjustment movement of the first piston 12 after opening of the first valve 52 is thus not countered by any simulator force. In addition the second piston 22 (and the further piston 24) are moved together with the inner piston, which causes a pressure build-up in the master brake cylinder 20 and hence a rise in brake pressure in the at least one wheel brake cylinder (not shown). The driver can therefore brake actively.

In contrast a volume reduction of the second pressure chamber 160 is suppressed after closing of the first valve 52. The inner piston 162, the second piston 22 and the further piston 24 therefore cannot be moved in parallel with the first piston 12. Instead, insofar as the second valve is at least partly opened, a braking medium volume is transferred from the first inner chamber 16 into the braking medium reservoir and hence the first inner chamber is reduced in size with simultaneous compression of the simulator spring 64. In this embodiment too, after "decoupling" of the master brake cylinder 20 from the brake activation element 10, the driver has an advantageous (standard) brake feel.

Figure 5:
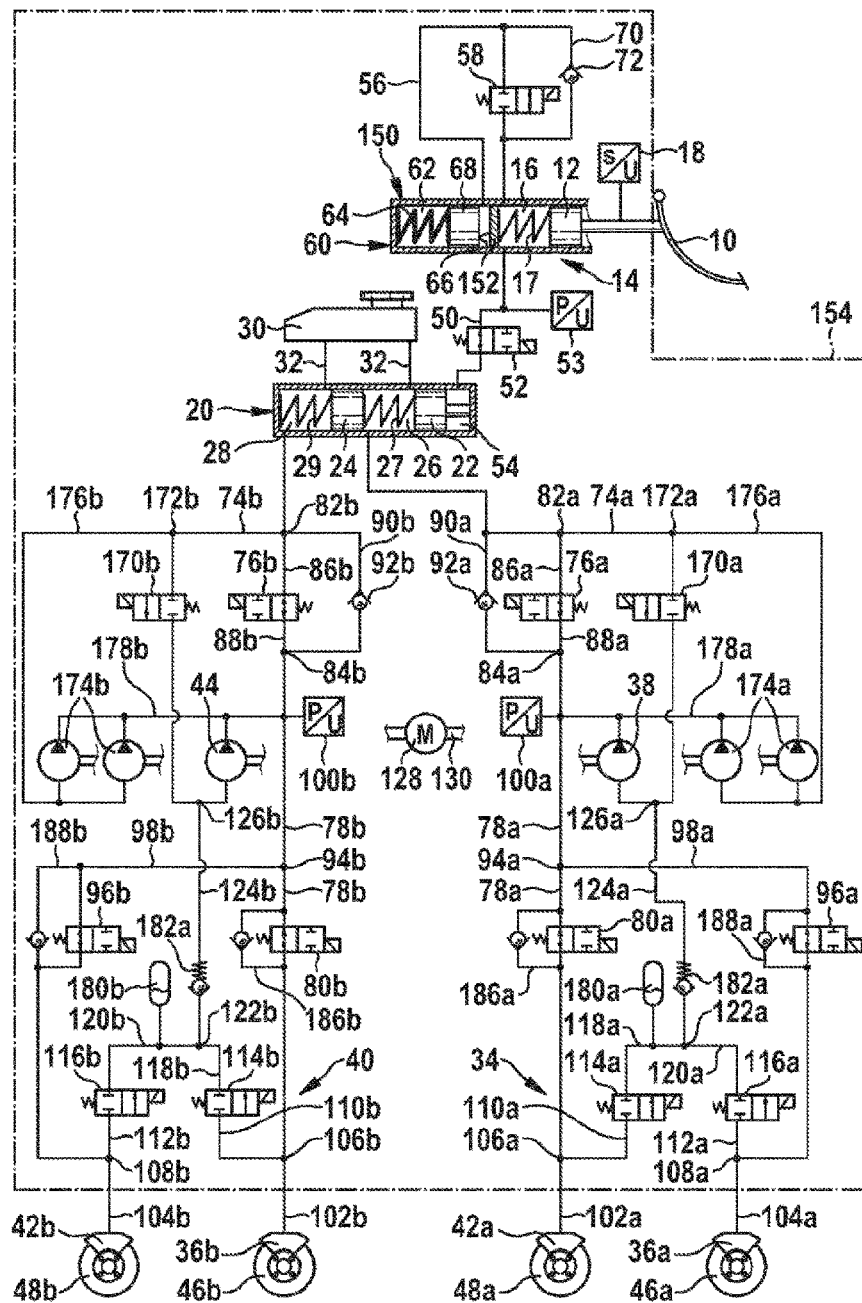
FIG. 5 a diagrammatic depiction of a fifth embodiment of the brake system.

FIG. 5 shows a diagrammatic depiction of a fifth embodiment of the brake system.

The brake system shown diagrammatically in FIG. 5 differs from the embodiment in FIG. 1 by a refinement of the brake circuits 34 and 40. For example a suction valve 170*a* and 170*b* is integrated in each suction line 74*a* and 74*b*. Via a branch point 172*a* or 172*b* formed between the master brake cylinder 20 and suction valve 170*a* and 170*b*, at least one further pump 174*a* and 174*b* is connected via a line 176*a* or 176*b* with a suction line 74*a* and 74*b*. A further line 178*a* or 178*b* runs from the pump 174*a* or 174*b* to the supply side of the pump 38 or 44. All pumps 38, 44, 174*a* and 174*b* can be arranged on the shaft 130 of the single pump motor 138 required.

Each of the brake circuits 34 and 40 also has a storage chamber 180a or 180b which is formed for example as a low-pressure storage chamber. The storage chamber 180a or 180b is connected to a line 120a or 120b running from a common branch point 122a or 122b to a wheel outlet valve 116a or 116b. Furthermore a non-return valve 182a and 182b is inserted in each line 124a and 124b respectively from a common branch point 122a or 122b to a supply line 74a or 4b.

The embodiment of the brake system described here, in addition to the driver braking mode and external force braking mode, can also be controlled in a dynamic braking mode in which the driver brake force transmitted to the first piston 12 can be transmitted via the at least partly opened first valve 52 at least partly to the second piston 22 so that the second piston 22 can be moved out of its starting position at least partly into the second inner chamber 16 of the master brake cylinder 20. At the same time by means of the pump 38 and 44 an additional braking medium volume can be pumped out of the storage chamber 180a or 180b into at least one wheel brake cylinder 36a, 36b, 42a and/or 42b.

The driver therefore has the possibility, during dynamic braking mode, to brake directly into the master brake cylinder 20. This offers the advantage that the dynamic required is achieved with smaller power of the pump motor 128 because of the support by the driver. By reducing the pump and motor power, the costs and/or construction space required for the brake system can be reduced despite the highly dynamic braking which can be achieved.

To control the brake system in the dynamic braking mode, the first valve 52 is at least partly opened while the second valve 58 is at least partly and preferably completely closed. Thus highly dynamic braking can be achieved easily. (The pedal feedback effects which may occur because of pressure fluctuations on the pump input side are scarcely perceived by the driver in a braking situation in which dynamic braking is advantageous).

The non-return valves 182a and 182b between the allocated pump 38 or 44 and the coupled storage chamber 180a or 180b prevent this storage chamber 180a or 180b from being filled when pressure is present in the master brake cylinder 20. By means of the suction valves 170a and 170b, at the same time a fall in the pump input pressure is achieved to evacuate the storage chambers 180a and 180b.

Optionally the wheel inlet valves 80a, 80b, 96a and 96b can have parallel bypass lines 186a, 186b, 188a and 188b with non-return valves.

All embodiments described above can be used in external force braking mode as a brake-by-wire system without feedback of the hydraulics on the brake activation element 10. Because of the low suction losses, an adequate pressure build-up dynamic is achieved with only one pump motor 130, the power and size of which are comparable to the values of the drive of an electromechanical brake servo.

For pumps 38, 44, 174a and 174b of all embodiments, different pump types can be used such as for example piston pumps, vane pumps and/or gear pumps. The valves fitted in the brake systems can be switch valves or proportional valves. All brake systems can be adapted to different brake circuit divisions. Also a self-reinforcing design of the wheel brakes is possible with all brake systems. By these means, a reinforcement which can be used arbitrarily frequently can be achieved in each brake system mode.

The method for operating a brake system has the method steps already described above with reference to the brake system. Therefore no detailed description of this method is given.

The invention claimed is:

1. A brake system for a vehicle comprising:
a brake activation element;
an activation element coupling device that defines a first inner chamber and a simulator chamber, the first inner chamber fluidically separated from the simulator chamber, and that includes:
  a first piston (i) positioned in the activation element coupling device and (ii) operatively connected to the brake activation element such that a driver brake force applied to the brake activation element is transmitted to the first piston and moves the first piston at least partly into the first inner chamber of the activation element coupling device; and
  a simulator spring (i) positioned in the simulator chamber so as to delimit a pre-chamber, and (ii) configured to exert a simulator force that counters movement of the first piston into the first inner chamber;
a braking medium reservoir;
a master brake cylinder that includes at least one second piston (i) positioned in the master brake cylinder to delimit a first pressure chamber and at least one second inner chamber, and (ii) configured to open at least one hydraulic connection between the at least one second inner chamber and the braking medium reservoir at a starting position, and close the hydraulic connection over a minimum movement travel;
a first valve that is operable to hydraulically connect the first inner chamber with the first pressure chamber;
a second valve that is operable to hydraulically connect the first inner chamber with the pre-chamber; and
at least one first brake circuit arranged on the master brake cylinder and including at least one first wheel brake cylinder and at least one first pump,
wherein, in a driver braking mode, the first valve is opened and second valve is closed, such that the driver brake force is transmitted to the at least one second piston to move the at least one second piston out of the starting position, build up pressure in the at least one second inner chamber, and operate the at least one first wheel brake cylinder, and the simulator force is not exerted; and
wherein, in an external force braking mode, the first valve is closed and the second valve is opened, such that the driver brake force is not transmitted to the at least one second piston and movement of the at least one second piston is suppressed, the driver brake force is transmitted to the simulator spring and countered by the simulator force, and a braking medium volume is pumped out of the braking medium reservoir via the master brake cylinder into the at least one first wheel brake cylinder by the at least one first pump.

2. The brake system as claimed in claim 1, wherein at least one of (i) the first valve is a normally open valve, and (ii) the second valve is a normally closed valve.

3. The brake system as claimed in claim 1, further comprising:
a control device configured (i) to operate the brake system out of the driver braking mode into the external force braking mode and out of the external force braking mode into the driver braking mode, (ii) to receive an actuating variable provided by a sensor in relation to activation of the brake activation element, (iii) to establish a nominal braking medium volume to be displaced into the at least one first wheel brake cylinder with reference to the actuating variable received, and (iv) to operate the at least one first pump into the external force braking mode such that the at least one first pump pumps a braking medium volume corresponding to the nominal braking medium volume is pumped out of the braking medium reservoir via the master brake cylinder into the at least one first wheel brake cylinder.

4. The brake system as claimed in claim 1, wherein:
the brake system is further configured to operate in a dynamic braking mode, in which the driver brake force transmitted to the first piston is transmitted at least partly to the at least one second piston such that the at least one second piston is moved out of the starting position at least partly into the at least one second inner chamber of the master brake cylinder, and
one of the at least one first pump and at least one further pump is configured to pump an additional braking medium volume out of at least one storage chamber of the at least one first brake circuit into the at least one first wheel brake cylinder.

5. The brake system as claimed in claim 1, wherein a suction line length from a suction side of the at least one first pump to the master brake cylinder is less than 25 cm.

6. The brake system as claimed in claim 1, wherein:
the activation element coupling device further includes a moveable inner piston, that delimits a second pressure chamber from the first inner chamber, and that is supported via the simulator spring,
the at least one second piston of the master brake cylinder is arranged on the inner piston such that the driver brake force transmitted to the first piston is transmitted at least partly via the inner piston to the at least one second piston, and
the first valve is further configured to connect the second pressure chamber to the first pressure chamber.

7. The brake system as claimed in claim 1, wherein the second valve is further configured to connect the first inner chamber to the braking medium reservoir.

8. The brake system as claimed in claim 1, further comprising:
at least one second brake circuit arranged on the master brake cylinder and including at least one second wheel brake cylinder and at least one second pump; and
precisely one pump motor, wherein the one pump motor includes a shaft on which the at least one first pump and the at least one second pump are positioned.

9. A method for operating a brake system for a vehicle, the brake system including (i) a brake activation element, (ii) an activation element coupling device that defines a first inner chamber and a simulator chamber, the first inner chamber fluidically separated from the simulator chamber, a first piston which is moved at least partly into the first inner chamber of the activation element coupling device in response to activation of the brake activation element, and a simulator spring positioned in the simulator chamber to delimit a pre-chamber, and configured to exert a simulator force that counters movement of the first piston into the first inner chamber (iii) a master brake cylinder with a second piston that delimits a first pressure chamber and a second inner chamber, (iv) a braking medium reservoir, which is hydraulically connected to the second inner chamber of the master brake cylinder when the second piston is in a starting position, and is hydraulically disconnected from the second inner chamber in response to movement of the second piston over a minimum movement travel, (v) a first valve that is operable to hydraulically connect the first inner chamber with the first pressure chamber, (vi) a second valve that is operable to hydraulically connect the first inner chamber with the pre-chamber, and (vii) at least one brake circuit arranged on the master brake cylinder and having at least one wheel brake cylinder and at least one pump, the method comprising:
operating the brake system in a driver braking mode in which the first valve is opened and the second valve is closed, such that a driver brake force transmitted to the first piston is transmitted to the second piston to move the second piston out of the starting position at least partly into the second inner chamber of the master brake cylinder, and such that the simulator force is not exerted; and
controlling the brake system out of the driver braking mode at least into one external force braking mode, the controlling including:
closing the first valve and opening the second valve to prevent a movement of the second piston by the minimum movement travel despite the driver brake force applied to the first piston and to cause the simulator force to counter the movement of the first piston;
determining an actuating variable in relation to activation of the brake activation element;
establishing a nominal braking medium volume to be displaced into the at least one wheel brake cylinder with reference to the actuating variable determined; and
operating the at least one pump to pump a braking medium volume corresponding to the nominal braking medium volume out of the braking medium reservoir via the master brake cylinder into the at least one wheel brake cylinder.

10. The brake system as claimed in claim 5 wherein the suction line length from the suction side of the at least one first pump to the master brake cylinder is less than 20 cm.

11. The brake system as claimed in claim 10 wherein the suction line length from the suction side of the at least one first pump to the master brake cylinder is less than 15 cm.

12. The brake system as claimed in claim 1, the activation element coupling device further including a return spring positioned in the first inner chamber and configured to counter the movement of the first piston, wherein:
the first inner chamber and the simulator chamber are fluidically separated by a solid wall of the activation element coupling device;
the solid wall together with the simulator spring delimits the pre-chamber; and
the return spring is supported between the solid wall and the first piston.

13. The brake system as claimed in claim 1, wherein the activation element coupling device is configured such that the simulator chamber and the first inner chamber are in a parallel arrangement.

* * * * *